(12) United States Patent
Kim

(10) Patent No.: US 11,712,140 B2
(45) Date of Patent: Aug. 1, 2023

(54) ROBOT CLEANER

(71) Applicant: LG ELECTRONICS INC., Seoul (KR)

(72) Inventor: Hwang Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 337 days.

(21) Appl. No.: 16/985,871

(22) Filed: Aug. 5, 2020

(65) Prior Publication Data

US 2021/0161342 A1  Jun. 3, 2021

(30) Foreign Application Priority Data

Nov. 29, 2019 (KR) .......................... 10-2019-0156711

(51) Int. Cl.
*A47L 9/04* (2006.01)
*A47L 9/28* (2006.01)
*A47L 9/00* (2006.01)

(52) U.S. Cl.
CPC ............. *A47L 9/0494* (2013.01); *A47L 9/009* (2013.01); *A47L 9/0477* (2013.01); *A47L 9/2826* (2013.01); *A47L 9/2847* (2013.01); *A47L 9/2852* (2013.01); *A47L 2201/04* (2013.01); *A47L 2201/06* (2013.01)

(58) Field of Classification Search
None
See application file for complete search history.

(56) References Cited

U.S. PATENT DOCUMENTS

| 6,263,989 B1 | 7/2001 | Won |
| 2013/0340201 A1 | 12/2013 | Jang et al. |
| 2014/0158439 A1 | 6/2014 | Kim et al. |
| 2014/0166375 A1 | 6/2014 | Windorfer |
| 2015/0150429 A1 | 6/2015 | Yoo et al. |

FOREIGN PATENT DOCUMENTS

| CN | 103505155 | 1/2014 |
| CN | 103860109 | 11/2017 |
| JP | 2000-202792 | 7/2000 |
| KR | 10-2014-0000811 | 1/2014 |
| KR | 10-1386011 | 4/2014 |

(Continued)

OTHER PUBLICATIONS

KR 102014 0067705 English Translation (Year: 2014).*

(Continued)

*Primary Examiner* — Brian D Keller
(74) *Attorney, Agent, or Firm* — KED & Associates, LLP

(57) ABSTRACT

Provided is a robot cleaner including a main body including a suction portion disposed therein, a main wheel for moving the main body, wherein a vertical level of the main wheel varies in a vertical direction with respect to the main body, an auxiliary wheel disposed at a front portion or a rear portion of the main body, wherein a vertical level of the auxiliary wheel is fixed with respect to the main body, and a driving member assembly disposed in the main body, wherein the driving member assembly varies a vertical level of the main body from a floor face while rotating in forward and rearward directions of the main body, wherein the driving member assembly has different hitting radii when rotating forward and rearward.

14 Claims, 7 Drawing Sheets

(56) References Cited

FOREIGN PATENT DOCUMENTS

KR    10-2014-0067705    6/2014
KR    10-2015-0065134    6/2015

OTHER PUBLICATIONS

Korean Office Action dated Mar. 18, 2021 issued in KR Application No. 10-2019-0156711.
Taiwanese Office Action dated Apr. 8, 2021 issued in TW Application No. 109128281.
Korean Office Action dated Jan. 4, 2021 issued in KR Application No. 10-2019-0156711.
International Search Report dated Jan. 12, 2021 issued in International Application No. PCT/KR2020/009580.

* cited by examiner

ROBOT CLEANER

CROSS-REFERENCE TO RELATED APPLICATION

This application claims priority under 35 U.S.C. § 119 to Korean Application No. 10-2019-0156711 filed on Nov. 29, 2019, whose entire disclosure is hereby incorporated by reference.

BACKGROUND

1. Field

The present disclosure relates to a robot cleaner, and more particularly, to a robot cleaner capable of easily passing over an obstacle.

2. Background

Generally, a vacuum cleaner is an appliance that sucks air containing a foreign substance from outside by driving an air suction apparatus, which is disposed inside a cleaner main body to generate an air suction force, and separates and collects the foreign substance. The vacuum cleaner performing the above function is classified into a manual vacuum cleaner that is directly manipulated by a user and a robot cleaner that performs cleaning by itself without the user manipulation. A robot cleaner sucks various foreign substances lying on a face to be cleaned while autonomously travelling on the face-to-be cleaned.

According to U.S. Patent Application Publication No. US2014/0166375A, a technology in which a member that hits a floor face while a wheel rotates is included to pass over an obstacle is disclosed. However, according to the prior art, because the member only provides a certain trajectory when hitting the floor face, passable obstacles may be limited. Specifically, a robot cleaner according to the prior art may pass over a certain obstacle, but may often fail to pass over another obstacle.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
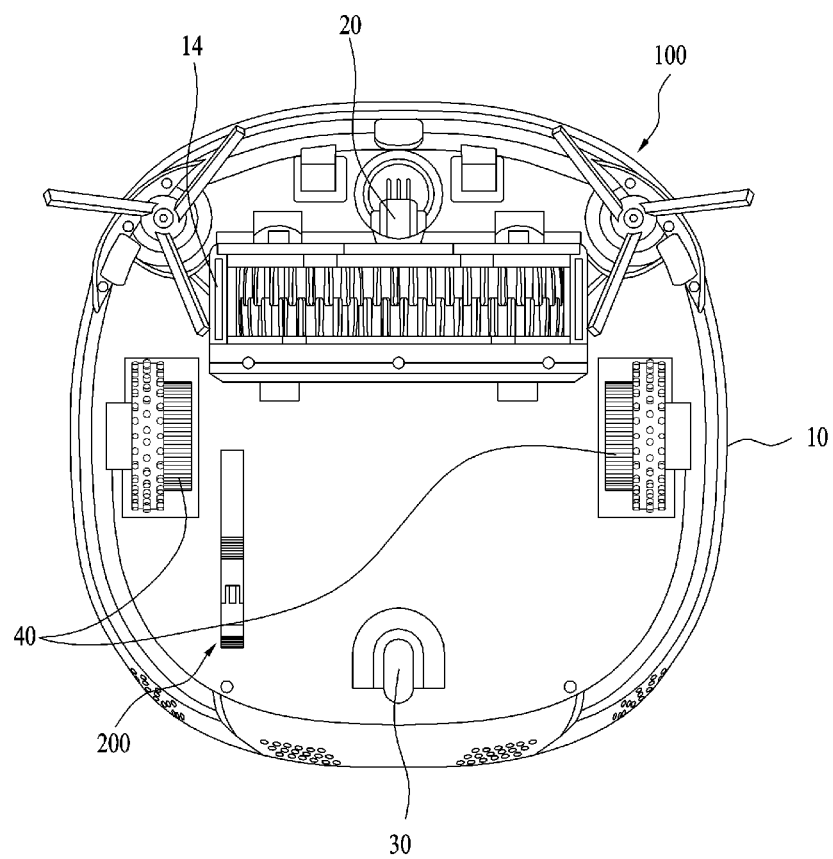
FIG. 1 is a view illustrating a bottom face of a robot cleaner according to an embodiment of the present disclosure.

Hereinafter, a preferred embodiment of the present disclosure that may specifically realize the above objects will be described with reference to the accompanying drawings. In this process, a size, a shape, or the like of a component shown in the drawings may be exaggerated for clarity and convenience of the description. In addition, terms specifically defined in consideration of a configuration and an operation of the present disclosure may vary depending on a user or an operator's intention or practice. Definitions of such terms should be made based on the contents throughout this specification.

Figure 2:
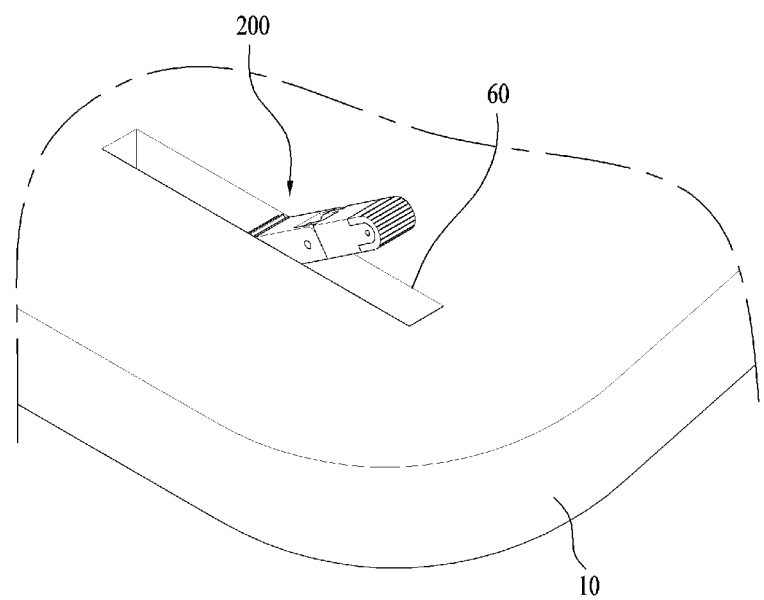
FIG. 2 is a view specifically illustrating a portion of FIG. 1.

FIG. 1 is a view illustrating a bottom face of a robot cleaner according to an embodiment of the present disclosure. Further, FIG. 2 is a view specifically illustrating a portion of FIG. 1. Hereinafter, a description will be achieved with reference to FIGS. 1 and 2. An embodiment of the present disclosure includes a main body 10 for forming an exterior of the robot cleaner, a dust suction portion and dust storage installed in the main body 10, and main wheels 40 for moving the main body 10.

The dust suction portion may be installed inside the main body 10 to provide a suction force for sucking dust and the like from outside. The dust storage may be installed inside the main body 10 to provide therein a space in which a foreign substance such as the dust and the like sucked through the dust suction portion may be stored. When the foreign substance such as the dust and the like is accumulated in the dust storage, the user may remove the dust storage from the main body 10 to remove the foreign substance in the dust storage.

Main wheels 40 may be arranged beneath the main body 10 to move the main body 10 back and forth or to turn the main body 10. In this connection, as the main wheels 40 are rotated, the main body 10 may change a direction or move forward or rearward. In this connection, the main wheels 40 are arranged on left and right sides of the main body 10 independently of each other. The main wheels 40 on the left and right sides may be driven independently of each other. In one example, the robot cleaner includes a front auxiliary wheel 20 for supporting one side of the main body 10 and assisting the movement of the main body 10 by the main wheels 40.

A suction portion (or suction port) 14 may include an agitator disposed on the main body 10 and being brought into contact with a floor face on which cleaning is performed while rotating, a suction hole defined in the main body 10 and capable of sucking the external foreign substance by the suction force generated inside the main body 10, and the like.

In one example, a rear auxiliary wheel 30 may be disposed rearward of the main wheels 40 to support the other side of the main body 10. The front auxiliary wheel 20 and the rear auxiliary wheel 30 are arranged to be freely rotatable in a horizontal direction with respect to the main body 10. In one example, the front auxiliary wheel 20 and the rear auxiliary wheel 30 are arranged to have fixed vertical levels with respect to the main body 10.

In one example, although the main wheels 40 are not rotatable in the horizontal direction with respect to the main body 10, the main wheels 40 are composed of two wheels on both sides and the wheels on the both sides rotate at different rotational speeds or in different directions, so that the main body 10 may turn left or right. In addition, the main wheels 40 may move in a vertical direction with respect to the main body 10 such that a vertical level of the main body 10 from the floor face varies. When the main wheels 40 descends toward the floor face, the vertical level of the main body 10 from the floor face may be increased. Further, when the main wheels 40 ascends from the floor face, the vertical level of the main body 10 from the floor face may be reduced.

In addition, the main wheels 40 are arranged on the both sides of the main body 10, and vertical levels of the main wheels 40 may become different from each other. When the main body 10 travels on floor faces of a left floor face and a right floor face having different vertical levels or passes over an obstacle, a main wheel on a floor face with a lower vertical level may descend with respect to the main body, but a main wheel on a floor face with a higher vertical level may ascend with respect to the main body. As a result, a horizontal level of the main body 10 may be maintained when the robot cleaner passes the corresponding location.

A side brush assembly 100 is disposed on one side of the main body 10. In the side brush assembly 100, as a brush rotates, the brush moves an obstacle located away from a bottom of the main body 10 or an obstacle in contact with a wall to be sucked into the suction portion 14. The side brush assembly 100 may be driven together with the suction portion 14 when the robot cleaner is driven.

A recess 60 in which a driving member assembly 200 is accommodated is defined in a bottom face of the main body 10. The driving member assembly 200 may be exposed downward of the bottom face of the main body 10 while rotating forward or rearward of the main body 10. In a state in which the driving member assembly 200 is not driven, the driving member assembly 200 is completely accommodated in the recess 60, so that the driving member assembly 200 is not disposed lower than the bottom face of the main body 10. Thus, a user is not able to view the driving member assembly 200 when viewing the main body 10 from the side.

The recess 60 may extend to have a length greater than that of the driving member assembly 200 such that the driving member assembly 200 may be accommodated in the recess 60 in both of situations where the rotation is stopped in a state in which the driving member assembly 200 is rotated forward and where the rotation is stopped in a state in which the driving member assembly 200 is rotated rearward.

Figure 3:
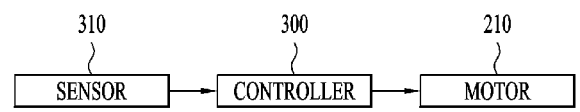
FIG. 3 is a control block diagram of an embodiment.

FIG. 3 is a control block diagram of an embodiment. Referring to FIG. 3, in an embodiment, a sensor 310 for sensing rotation information of the main wheels 40 and a controller 300 for driving the driving member assembly 200 in response to a signal transmitted from the sensor 310 are included.

When it is determined that the driving member assembly 200 needs to be driven based on the signal transmitted from the sensor 310, the controller 300 may drive a motor 210 of the driving member assembly 200. When the controller 300 operates the motor 210, the motor 210 may be repeatedly rotated clockwise or counterclockwise. In addition, the motor 210 may be rotated such that each rotation has a rotation angle of 180 degrees. The motor 210 has the rotation angle of 180 degrees when rotated clockwise and also has the rotation angle of 180 degrees when rotated counterclockwise. When it is determined that the driving member assembly 200 does not need to be driven based on the signal transmitted from the sensor 310, the controller 300 does not drive the motor 210 of the driving member assembly 200.

The controller 300 may drive the driving member assembly 200 when the numbers of rotations of the main wheels 40 arranged on the both sides of the main body 10 received from the sensor 310 are different. For example, when the main body 10 encounters the obstacle and is unable to move to a desired path and unable to escape from a certain location, the numbers of rotations of the two main wheels 40 arranged on the left and right sides may be different. In this connection, the controller 300 may operate the driving member assembly 200 to induce the robot cleaner to escape the obstacle.

The controller 300 may drive the driving member assembly 200 when the sensor 310 senses that a slip has occurred on one of the main wheels 40 arranged on the both sides of the main body 10. Each main wheel 40 receives a rotational force from an individual motor. When a difference between a travel distance of the main body 10 and the number of rotations transmitted from the motor is equal to or greater than a predetermined value, it may be seen that the slip has occurred on the corresponding main wheel. That is, it may be a situation where the wheel does not travel as much as desired on a desired path due to the slip. Such situation may be a situation where the main body 10 has encountered the obstacle and the wheel is caught by the obstacle. In this connection, the controller 300 may operate the driving member assembly 200 to induce the robot cleaner to escape the obstacle.

Figure 4:
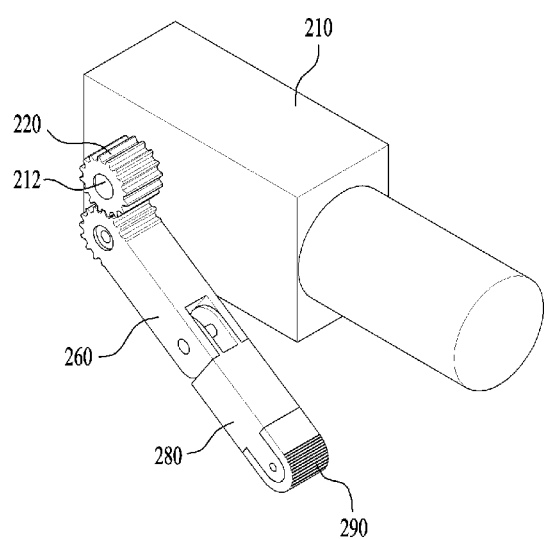
FIG. 4 is a view for illustrating main components in an embodiment.
Figure 5:
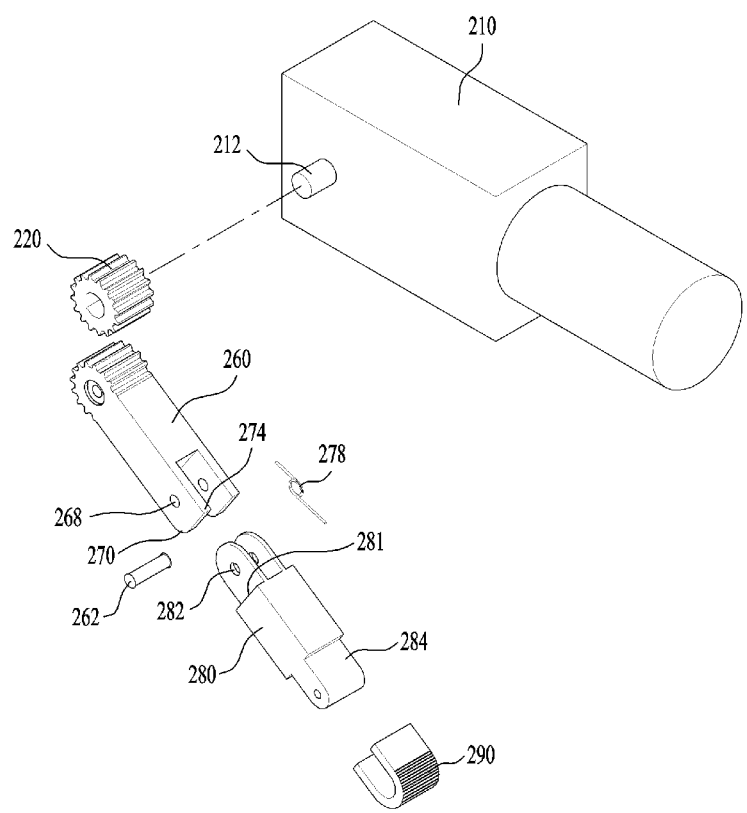
FIG. 5 is an exploded perspective view of FIG. 4.

FIG. 4 is a view for illustrating main components in an embodiment. Further, FIG. 5 is an exploded perspective view of FIG. 4. Referring to FIGS. 4 and 5, the driving member assembly 200 includes a motor 210 that provides a rotational force for forward and reverse rotation, and a link assembly rotated by the motor 210.

In the motor 210, the forward and reverse rotations are sequentially performed. Rotation angles of the forward and reverse rotations may be equally approximately 180 degrees. When the motor 210 is terminated after performing the forward rotation immediately before being driven, the motor 210 starts to be driven while performing the reverse rotation. On the other hand, when the motor 210 is terminated after performing the reverse rotation immediately before being driven, the motor 210 starts to be driven while performing the forward rotation. Then, when the motor 210 is driven, after performing the forward rotation by 180 degrees, the reverse rotation is started. In addition, after performing the reverse rotation by 180 degrees, the forward rotation is started. In such a manner, the rotations are alternately performed.

A gear 220 is formed on a rotation shaft 212 of the motor 210. Teeth are formed on the gear 220. The gear 220 transmits a rotation provided from the rotation shaft 212 of the motor 210 to the link assembly as it is. The link assembly includes a first link 260 and a second link 280 that are engaged with the gear 220 and rotated. The link assembly may be composed of two links rotatable to each other.

The first link 260 is equipped with a gear having teeth that are engaged with the teeth of the gear 220 at one end thereof. Thus, when the gear 220 is rotated, the first link 260 is rotated together. In this connection, a radius, a thickness of a tooth, and a spacing between two teeth of the gear 220 are the same as those of the gear of the first link 260 such that a rotation angle of the gear 220 may be transmitted to the first link 260 as it is. That is, when the gear 220 rotates 180 degrees in the forward direction, the first link 260 rotates 180 degrees in the reverse direction. On the other hand, when the gear 220 rotates 180 degrees in the reverse direction, the first link 260 rotates 180 degrees in the forward direction.

A through-hole 268 through which a rotation shaft 262 passes is defined in the first link 260 at an opposite side of a portion where the gear is formed. In addition, a through-hole 282 through which the rotation shaft 262 passes is also defined in the second link 280. One rotation shaft 262 penetrates both the through-hole of the first link 260 and the through-hole of the second link 280, so that the first link 260 and the second link 280 are rotatable with respect to each other.

One end of the first link 260 has an empty space defined at a central portion thereof and includes flanges respectively extending at both sides. The through-hole 268 is defined in the flanges. The second link 280 is inserted between the two flanges, and a portion where the first link 260 and the second link 280 overlap is present. In the corresponding portion, the rotation shaft 262 penetrates the two links.

Guide grooves 284 are defined at one end of the second link 280. The guide grooves 284 are defined to have a size less than a size of a central portion of the second link 280. The guide grooves 284 are respectively defined in a front face and a rear face of the second link 280. In this connection, the front face is a face directed in a front direction when the link assembly starts to rotate forward from a state of being folded in the recess 60. The rear face is a face directed in a rear direction when the link assembly starts to rotate rearward from the state of being folded in the recess 60.

A cover 290 made of a rubber material is disposed on the guide grooves 284. The cover 290 may be formed in a substantially 'U' shape and may be coupled to the guide grooves 284 while being in contact with total three faces of the guide grooves 284. The cover 290 is disposed to surround the front face and a rear face of one end of the second link 280, so that the second link 280 may always be in contact with the floor while being rotated forward and rearward. The cover 290 is made of the rubber material, so that the cover 290 may have high friction with respect to the floor face. That is, the cover 290 is made of a material that is easily deformed compared to the first link 260 and the second link 280, so that damage to the floor face occurring when the driving member assembly hits the floor may be prevented.

A stopper (or stopper surface) 274 and a guide (or guide surface) 270 are formed on both sides of the first link 260 around the through-hole 268 into which the rotation shaft 262 is coupled, and a combination of these components may be referred to as a hinge or joint. The stopper 274 limits a direction in which the second link 280 is rotated. The stopper 274 may be of a square shape having a right angle around the rotation shaft 262.

The second link 280 includes a body extending from a portion where the through-hole 282 is defined. The body is a portion with a thickness greater than that of the portion where the through-hole 282 is defined, and extends from a portion where a step 281 is formed. That is, the portion where the through-hole 282 is defined is inserted between the flanges of the first link 260 and coupled to the flanges of the first link 260. On the other hand, the body includes the step 281, and thus, is not able to be inserted between the flanges. Thus, the second link 280 may no longer rotate while the step 281 is in contact with the stopper 274. The stopper 274 may prevent the second link 280 from being folded toward the first link 260 when the second link 280 is rotated forward of the main body. The step 281 is formed perpendicular to a direction in which the first link 260 and the second link 280 are unfolded and coupled to each other.

The guide 270 is formed to be curved around the rotation shaft 262 such that the second link 280 is rotated along an outer circumferential face of the guide 270. When the second link 280 is rotated around the rotation shaft 262, the first link 260 may be folded toward the second link 280. The guide 270 may form an arc shape having the same radius around the rotation shaft 262. Thus, even when the second link 280 is rotated around the rotation shaft 262, the step 281 is not brought into contact with the guide 270. Thus, the second link 280 may be folded toward the first link 260. The guide 270 may induce the second link 280 to be folded toward the first link 260 when the second link 280 is rotated rearward of the main body.

A spring 278 for providing a restoring force to return to the second link 280 to a location where the first link 260 and the second link 280 are arranged in parallel when the second link 280 is rotated around the rotation shaft 262 is included. The spring 278 has one end fixed to the first link 260 and the other end fixed to the second link 280.

In a situation in which the second link 280 is folded with respect to the first link 260 when the link assembly is rotated rearward of the main body 10, the spring 278 guides the second link 280 to be unfolded with respect to the first link 260 when an external force is removed. When the first link 260 and the second link 280 are folded, the spring 278 is compressed. When the second link 280 is not in contact with the floor, the external force applied to the second link 280 is removed. Thus, the first link 260 and the second link 280 may be unfolded by the restoring force of the spring 278.

Figure 6:
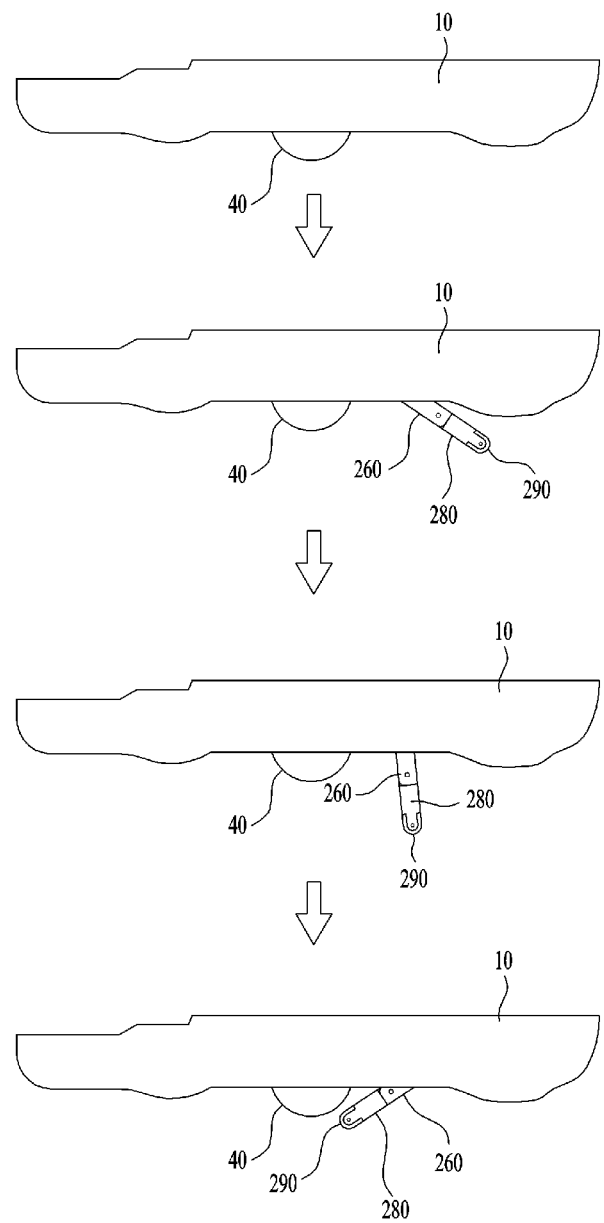
FIG. 6 is a view illustrating a state in which a driving member assembly is rotating in a forward direction.
Figure 7:
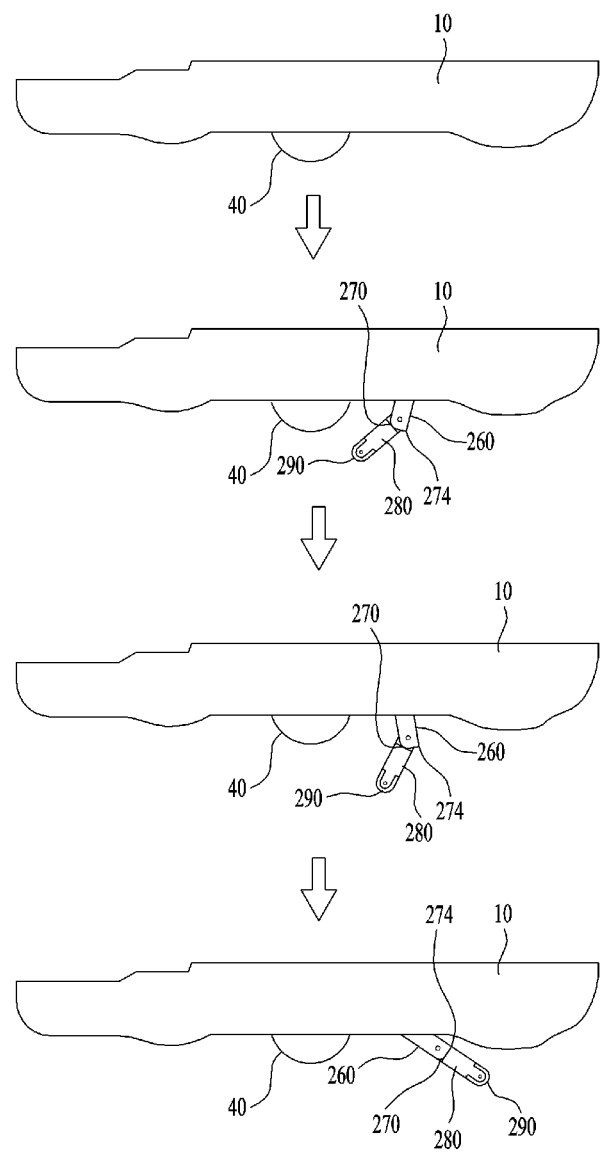
FIG. 7 is a view illustrating a state in which a driving member assembly is rotating in a rearward direction.

FIG. 6 is a view illustrating a state in which a driving member assembly is rotating in a forward direction. Further, FIG. 7 is a view illustrating a state in which a driving member assembly is rotating in a rearward direction. In FIGS. 6 and 7, a left direction means a front of the main body 10 and a right direction means a rear of the main body 10. That is, when the main body 10 is moved forward, the main wheels 40 move the main body in the left direction in FIGS. 6 and 7. On the other hand, when the main body 10 is moved rearward, the main wheels 40 move the main body in the right direction in FIGS. 6 and 7.

There may be a case in which the main body 10 should climb an obstacle at a vertical level higher than that of a floor face previously traveled or pass over an obstacle at a vertical level lower than that of the floor face previously traveled while traveling. In addition, a situation in which the vertical level of the floor face increases and then decreases or decreases and then increases may occur despite a short travel distance when the robot cleaner encounters the obstacle. In a process in which the robot cleaner passes over the obstacle, a situation in which it is difficult for the robot cleaner to sufficiently escape from the obstacle using the rotational force provided from the main wheels 40 may occur. For example, a situation where the main wheel falls into a narrow gap or is stuck in a deep groove and is not sufficiently in contact with the floor may be considered.

When the sensor 310 obtains information about such situation using the rotation information of the main wheels 40, the controller 300 may allow the driving member assembly 200 to be driven. When the motor 210 of the driving member assembly 200 is driven by the controller 300, the link assembly 260 and 280 may rotate forward or rearward of the main body 10. When the link assembly is rotated forward as in FIG. 6, the link assembly hits the floor in the state in which the first link 260 and the second link 280 are folded because the second link 280 is caught by the stopper 274 and is not able to be rotated. Thus, a radius at which the link assembly hits the floor may be kept constant at a length of the unfolded first link 260 and second link 280. Even when the cover 290 is brought into contact with the floor face before the link assembly is rotated by 90 degrees with respect to the bottom face of the main body 10, the second link 280 is rotated in an unfolded state.

Even when the rotation of the link assembly is made as shown in FIG. 6, when it is determined that the main body has not escaped the obstacle by the information obtained by the sensor 310 from the main wheels 40, the controller 300 may rotate the link assembly again in an opposite direction.

The link assembly is rotated rearward of the main body 10 as shown in FIG. 7. In this connection, the link assembly may hit the floor face before the second link 280 is rotated by 90 degrees perpendicular to the bottom face of the main body 10. In one example, the cover 290 first comes into contact with the floor face. Because there is a load of the main body 10, the first link 260 and the second link 280 may be folded as the second link 280 is rotated relative to the rotation shaft 262. In this connection, an angle at which the second link 280 is folded to the first link 260 may be changed based on characteristics of the floor face on which the main body 10 is located or the vertical level of the floor face.

That is, in the present embodiment, the driving member assembly 200 has different hitting radii when rotating forward and when rotating rearward. When the link assembly is rotated forward of the main body, the hitting radius is constant in the state in which the first link 260 and the second link 280 are unfolded. On the other hand, when the link assembly is rotated rearward of the main body, the hitting radius may vary because the second link 280 is folded variously with respect to the first link 260. When the link assembly is rotated forward, the hitting radius may be larger than that when rotated rearward.

In the present embodiment, because one driving member assembly may vary the hitting radius when hitting the floor, various types of motions may be generated when the movement of the main body to the obstacle is restricted. While the driving member assembly is rotated alternately forward and rearward, the main body may escape from the obstacle and the main body may move to a desired location.

Referring to FIG. 3, the recess 60 provides therein the space in which the first link 260 and the second link 280 are able to be accommodated while being unfolded. The recess 60 is extended in the front and rear directions of the main body 10 such that the first link 260 and the second link 280 may be accommodated therein in both of a case in which the driving of the motor 210 is terminated in the state in which the first link 260 and the second link 280 are rotated forward and a case in which the driving of the motor 210 is terminated in the state in which the first link 260 and the second link 280 are rotated rearward. That is, the recess 60 may be extended to have a length about twice the length of the unfolded first link 260 and second link 280. In addition, a width of the recess 60 is greater than widths of the first link 260 and the second link 280, so that the first link 260 and the second link 280 may be inserted into the recess 60 without friction.

The present disclosure is to provide a robot cleaner capable of stably passing over an obstacle. In addition, the present disclosure is to provide a robot cleaner that may prevent travel thereof from being interrupted resulted from being caught by obstacles of various shapes.

A spring applied for a suspension function of main wheels in a general robot cleaner has a linearity for a displacement and a load. In a state in which the main wheels are withdrawn on a floor, a spring restoring force becomes significantly reduced by an extended stroke and does not exert a sufficient ground reaction force (a normal force). Thus, a sufficient frictional force is not able to be provided to the main wheels, which causes the main wheels to idle. In order to solve such problem, the present disclosure provides a technology in which a link assembly having a length larger than a reachable range of the main wheels is disposed to allow the robot cleaner to escape from an obstacle.

The present disclosure includes a rotating motor and a link assembly operated by the motor. In this connection, a sensor may be included to determine a time point for driving the motor. The sensor may transmit information about a rotation of the main wheels to a controller, and the controller may determine a rotation time point of the link assembly.

The present disclosure includes a main body including a suction portion disposed therein, a main wheel for moving the main body, wherein a vertical level of the main wheel varies in a vertical direction with respect to the main body, an auxiliary wheel disposed at a front portion or a rear portion of the main body, wherein a vertical level of the auxiliary wheel is fixed with respect to the main body, and a driving member assembly disposed in the main body, wherein the driving member assembly varies a vertical level of the main body from a floor face while rotating in forward and rearward directions of the main body.

The driving member assembly may include a motor for providing a rotational force and a link assembly rotated by the motor. While the link assembly is not in operation, the link assembly is accommodated in a recess defined in a bottom face of the main body, so that the link assembly is not exposed downward of the bottom face of the main body. Thus, when the main body is moved, the link assembly does not interfere with the movement of the main body.

The link assembly is composed of a first link and a second link. The second link is able to rotate in one direction with respect to the first link, but is not able to rotate in the other direction. For example, the second link is able to rotate clockwise with respect to a rotation shaft disposed on the first link, but is not able to rotate counterclockwise. Thus, when the link assembly is rotated with respect to the main body, radii at which the link assembly is able to hit the floor upon in contact with the floor are different when rotating clockwise and counterclockwise. Thus, different forms of operation are possible. Thus, the robot cleaner is able to escape from various obstacles, thereby improving a travel performance of the main body.

According to the present disclosure, the robot cleaner may stably pass over the obstacle. According to the present disclosure, cleaning may be performed while the travel of the robot cleaner is not interrupted by the obstacle. In particular, the member that hits the floor in various manners is included in addition to the wheel that moves the robot cleaner, so that the robot cleaner may easily pass over the obstacle while the obstacles of various shapes are placed below the main body.

In one example, a robot comprises: a main body; a main wheel that is driven to move the main body; and a link assembly coupled to the main body, wherein the link assembly is configured to raise the main body from a floor by a first height when pivoting in a first direction, and to raise the main body from the floor by second height that differs from the first height when pivoting in a second direction.

The robot may further comprise a motor to provide a force to pivot the link assembly in the first direction or the second direction. A recess for accommodating the link assembly therein may be defined in a bottom of the main body.

The link assembly may include: a first link pivot by the force of the motor; and a second link rotatably coupled to the first link. The first link may include: a rotation shaft provided to rotate the second link therearound; and a stopper surface provided at one end of the first link, wherein the stopper surface contacts a portion of the second link to limit a rotation of the second link relative to the first link. The stopper surface prevents the second link from being folded toward the first link when the second link is rotated in the first direction toward a front of the main body.

The link assembly may include a rotation shaft provided to rotate the second link therearound, the first link may include a guide surface, and the guide surface may be formed to be curved around the rotation shaft such that the second link is rotated along the guide surface. The guide surface may have an arc shape having a consistent radius around the rotation shaft.

The link assembly may include a spring that provides a restoring force to return to the second link to a location where the first link and the second link are arranged in parallel when the second link is rotated around the rotation shaft. A first end of the spring may be fixed to the first link and a second end of the spring is fixed to the second link. The link assembly may include a cover made of a rubber material and provided an end of the link assembly.

The main wheel may be a first main wheel provided on a first side of the main body, and the robot may further comprise: a second main wheel provided on a second side of the main body; a sensor configured to detect rotation information of the first and second main wheels; and a controller configured to manage the motor to selectively pivot the link assembly based on the rotation information of the first and second main wheels.

The controller may be configured to manage the motor to pivot the link assembly when the rotation information indicates that a numbers of rotations of the first main wheel during a time period differs from a numbers of rotations of the second main wheel during the time period. The controller may be configured to manage the motor to pivot the link assembly when the rotation information indicates that a slip has occurred on at least one of the first main wheel or the second main wheel.

The robot may be a robot cleaner, and main body may include a suction port. A vertical level of the main wheel may vary with respect to the main body. The robot may further comprise at least one auxiliary wheel provided at a front portion or a rear portion of the main body, wherein a vertical level of the auxiliary wheel may be fixed with respect to the main body In another example, a robot may comprise: a main body; a motor; and a linkage coupled to the main body, the linkage including: a first link coupled to the main body, the first link pivoting in one of a first direction or a second direction based on a force from the motor to extend from a lower surface of the main body; a second link; and a hinge that connects the first and second links and is configured to not bend when the first link is pivoting in the first direction and to bend when the first link is pivoting in the second direction.

The robot may further comprise a sensor to detect whether a movement of the main body is obstructed by an obstacle, wherein the motor applies the force to the first link when the sensor detects that the movement of the main body is obstructed by the obstacle.

The motor may apply the force to cause the first link to pivot in the first direction when the sensor detects that the movement of the main body is obstructed by the obstacle, and the motor may apply the force to cause the first link to pivot in the second direction when the sensor detects that the movement of the main body continues to be obstructed by the obstacle after the first link pivots in a first direction.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
a main body;
a main wheel that is driven to move the main body; and
a link assembly that is coupled to the main body,
wherein the link assembly is configured to raise the main body from a floor by a first height when pivoting in a first direction, and to raise the main body from the floor by a second height that differs from the first height when pivoting in a second direction,
wherein the link assembly includes:
a first link pivoted by the force of the motor; and
a second link hingedly coupled to the first link,
wherein the link assembly includes a rotation shaft provided to rotate the second link therearound,
wherein the first link includes a guide surface,
wherein the guide surface is formed to be curved around the rotation shaft such that the second link is rotated along the guide surface, and
wherein the link assembly includes a spring that provides a restoring force to return to the second link to a location where the first link and the second link are arranged in parallel when the second link is rotated around the rotation shaft.

2. The robot of claim 1, further comprising a motor to provide a force to pivot the link assembly in the first direction or the second direction.

3. The robot of claim 2, wherein the main wheel is a first main wheel provided on a first side of the main body, and wherein the robot further comprises:
a second main wheel provided on a second side of the main body;
a sensor configured to detect rotation information of the first and second main wheels; and
a controller configured to manage the motor to selectively pivot the link assembly based on the rotation information of the first and second main wheels.

4. The robot of claim 3, wherein the controller is configured to manage the motor to pivot the link assembly when the rotation information indicates that a number of rotations of the first main wheel during a time period differs from a number of rotations of the second main wheel during the time period.

5. The robot of claim 3, wherein the controller is configured to manage the motor to pivot the link assembly when the rotation information indicates that a slip has occurred on at least one of the first main wheel or the second main wheel.

6. The robot of claim 1, wherein a recess for accommodating the link assembly therein is defined in a bottom surface of the main body.

7. The robot of claim 1,
wherein the link assembly includes a rotation shaft provided to rotate the second link therearound,
wherein the first link includes a stopper surface provided at one end of the first link, and
wherein the stopper surface contacts a portion of the second link to limit a rotation of the second link relative to the first link.

8. The robot of claim 7, wherein the stopper surface is configured to prevent the second link from being folded toward the first link when the second link is rotated in the first direction toward a front of the main body.

9. The robot of claim 1, wherein the guide surface has an arc shape having a consistent radius around the rotation shaft.

10. The robot of claim 1, wherein a first end of the spring is fixed to the first link and a second end of the spring is fixed to the second link.

11. The robot of claim 1, wherein the link assembly includes a cover made of a rubber material and provided an end of the link assembly.

12. The robot of claim 1, wherein the robot is a robot cleaner, and the main body includes a suction port.

13. The robot of claim 1, wherein a vertical level of the main wheel varies with respect to the main body.

14. The robot of claim 1, further comprising:
at least one auxiliary wheel provided at a front portion or a rear portion of the main body,
wherein a vertical level of the auxiliary wheel is fixed with respect to the main body.

* * * * *